W. W. SMITH.
FURNACE SLAG POCKET.
APPLICATION FILED OCT. 4, 1911.
1,042,046.
Patented Oct. 22, 1912.
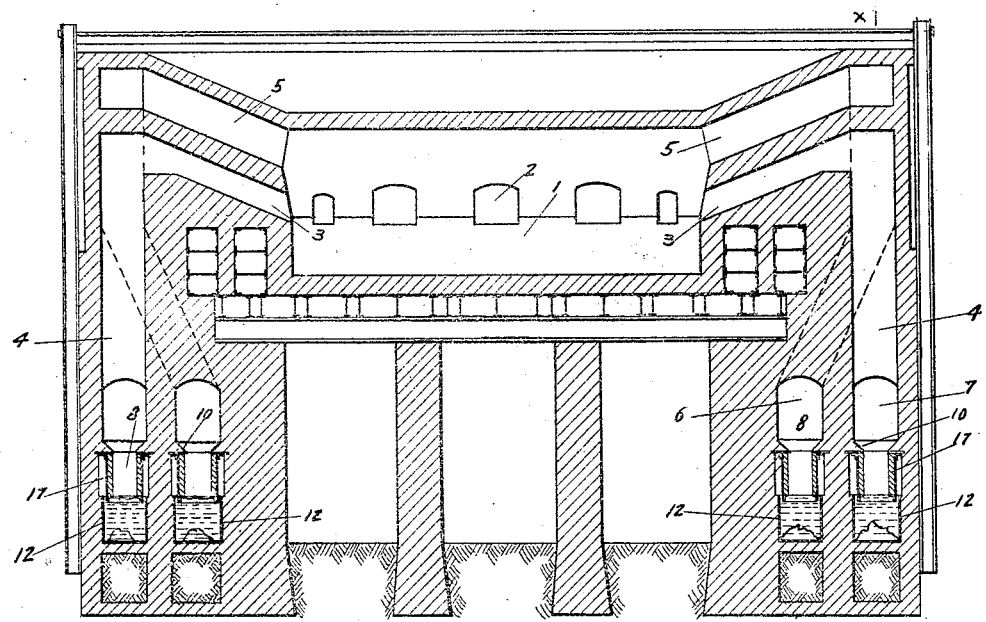
Fig. 1.
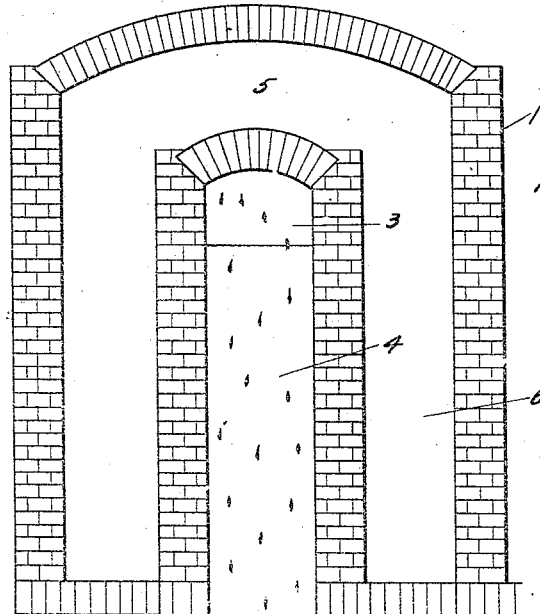
Fig. 2.
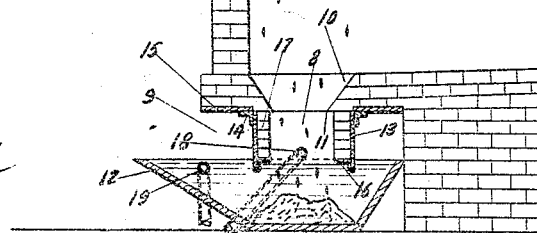
WITNESSES:
INVENTOR
William W. Smith
Attorney

UNITED STATES PATENT OFFICE.

WILLIAM W. SMITH, OF ENSLEY, ALABAMA.

FURNACE SLAG-POCKET.

1,042,046.   Specification of Letters Patent.   Patented Oct. 22, 1912.

Application filed October 4, 1911. Serial No. 652,839.

*To all whom it may concern:*

Be it known that I, WILLIAM W. SMITH, a citizen of the United States of America, residing at Ensley, in the county of Jefferson and State of Alabama, have invented certain new and useful Improvements in Furnace Slag-Pockets, of which the following is a specification.

My invention relates to improvements in means for disposing of the slag and molten material which tend to accumulate in furnace flues, particularly in the slag pockets of open hearth steel furnaces. The molten slag which drops through the down takes tends to choke the slag pocket or flue, necessitating the shutting down of the furnace to clean it out and involving considerable expense.

By my invention, all the molten slag or other material will be caught in a receptacle containing water which seals the opening from the flue to the slag pocket and is so disposed that the disintegrated slag can be shoveled out without moving the vessel.

In order that the use of water, as indicated, may not result in increasing the moisture in the gas or air, I contract the bottom of the flue opening, causing it to converge into an extension which projects down into the water. Further I introduce a supply of cold water into the vessel by a pipe which discharges under the flue opening and therefore keeps the coolest water there and prevents any tendency to steam.

By sealing the flue opening and leaving the receptacle in the slag pocket exposed, the material caught therein can be easily shoveled out at any time without shutting down the furnace.

My invention further comprises the details of construction and arrangement of parts hereinafter described and claimed, reference being had to the accompanying drawings, in which:—

Figure 1 is a vertical longitudinal sectional view through a steel furnace equipped with my invention. Fig. 2 is a transverse sectional view taken along the line $x$—$x$ of Fig. 1.

Similar reference numerals refer to similar parts throughout the drawings.

I have illustrated my invention in connection with a steel furnace 1, equipped with doors 2, gas flues 3, which connect with the vertical gas flues 4, and air courses 5, which connect with the vertical air flues 6. The air flues 6 are disposed on each side of the gas flues 4, which latter connect with the gas main 7 leading from the reversing valve (not shown). The air flues 6 are inclined toward the furnace center and both flues 4 and 6 have at their bottom ends centrally disposed openings 8 which open into the slag pockets 9. The openings 8 are disposed at the bottom of circular converging walls 10, which are inclined so as to cause all molten slag falling thereon to run down and drop off from the overhanging annular lip 11 down into a body of water contained in a receptacle 12 which is seated in the slag pocket. In order to seal the openings 8, I provide a depending metal flue 13 connected by an angle iron 14 to the bottom plate 15 fastened in the masonry, and I rivet to the bottom end of flue 13 a ring shaped angle iron 16, which serves as a support for a brick lining 17 in the sealing flue. The lower end of this sealing flue projects downwardly into and below the surface of the water level in the receptacle 12, which water level is maintained by an inlet pipe 18 which discharges water thereinto at or near the center of the sealing flue. An overflow pipe 19, near the top of the vessel 12, carries off the surplus water which accordingly circulates outwardly from beneath the opening 8. It will be noted that the outer end of the receptacle 12 is slanted so that rake or shovel may be used to draw out the molten material which usually disintegrates upon striking the water. The pipes 18 and 19 are disposed at the side of the receptacle so as not to interfere with the removal of the material therefrom.

Each of the flues 4 and 6 are equipped in the manner described with the water receptacle and opening 8 and sealing flue 13, and it follows that any molten material which would otherwise tend to accumulate in the slag pockets 9, will either drop directly down the flues and through the opening 8 into the water or fall upon the inclined walls 10 surrounding the opening 8 and will drop from the overhanging edge 11 into the water. The overhang is given the edge to prevent any tendency of the molten material to accumulate and harden on the sealing flue 13, which would occur by reason of the fact that the flue is cold. It will be noted that the exposed water surface is well below the active flow of the air and gases in the flues, hence it will have no tendency to steam or increase the moisture in the flues 4 and 6.

Obviously my improved mechanism may be utilized in connection with any one or all of the flues of a furnace, and by arranging the receptacle without the flue I avoid any interference with the normal flow of gases (which includes air or the furnace gas) through the flues.

The necessity of removing any part of the equipment is eliminated by my apparatus and the furnace slag flues can be kept clean at a nominal cost and without shutting down.

Having thus described my invention, what I claim as new and desire to secure by Letters Patent, is:—

1. The combination with a furnace having a gas flue which leads upwardly and has a contracted opening at its bottom, of a slag receptacle disposed beneath said opening and filled with a body of water which surrounds and seals the wall which surrounds said opening, the water being spaced a substantial distance from the inner wall of the flue, a wall which surrounds said opening depending downwardly into the body of water and tending to shield same from the hot gases flowing in said gas flue, and means to introduce cold water beneath said opening to produce a circulation therefrom outwardly.

2. The combination, in a steel furnace having upright and horizontal air and gas flues, of means to provide for the ready removal of slag which tends to accumulate in said horizontal flue, comprising a water receptacle, there being an opening in the bottom of the horizontal flue disposed beneath the upright flue and in position to collect the slag which falls down said upright flue, a sealing flue which is overhung by the bottom walls of such opening and extends from said opening down into the water in said receptacle which is disposed so as to permit the slag to be withdrawn therefrom without breaking the seal, substantially as described.

3. The combination, in a steel furnace having upright air and gas flues having horizontal portions, of means to provide for the ready removal of slag which tends to accumulate in the horizontal portions of said flues, comprising a water receptacle spaced from the bottom of a horizontal portion of one of said flues which is provided with a contracted opening in its bottom wall, said opening converging like a hopper to a relatively small central outlet beneath the upright portion of the flue, and a sealing flue which is overhung by the bottom edge of said opening and extends down vertically into the water in said receptacle and is disposed so as to permit the slag to be withdrawn from the receptacle without breaking the seal, substantially as described.

In testimony whereof I affix my signature in presence of two witnesses.

WILLIAM W. SMITH.

Witnesses:
NOMIE WELSH,
R. D. JOHNSTON, Jr.